United States Patent
Szabo et al.

(10) Patent No.: US 7,596,533 B2
(45) Date of Patent: Sep. 29, 2009

(54) PERSONALIZED MULTI-SERVICE COMPUTER ENVIRONMENT

(76) Inventors: Andrew Szabo, 400 Valley Rd., Cos Cob, CT (US) 06807; Seth Elliott, 425 Park Ave., 5th floor, New York, NY (US) 10022; Andrew Stevens, 210 West 101st St., Apt. #12J, New York, NY (US) 10025; William Young, 669 River Trace Rd., Westerville, OH (US) 43081

( * ) Notice: Subject to any disclaimer, the term of this patent is extended or adjusted under 35 U.S.C. 154(b) by 451 days.

(21) Appl. No.: 11/467,888

(22) Filed: Aug. 28, 2006

(65) Prior Publication Data

US 2007/0143439 A1 Jun. 21, 2007

Related U.S. Application Data

(63) Continuation of application No. 11/423,847, filed on Jun. 13, 2006, which is a continuation of application No. 10/715,218, filed on Nov. 17, 2003, now Pat. No. 7,062,475, which is a continuation of application No. 09/584,057, filed on May 30, 2000, now abandoned.

(51) Int. Cl.
*G06F 17/00* (2006.01)
*G06F 17/20* (2006.01)
(52) U.S. Cl. .............................. 706/11; 706/13; 706/14
(58) Field of Classification Search ........................ None
See application file for complete search history.

(56) References Cited

U.S. PATENT DOCUMENTS

| | | | |
|---|---|---|---|
| 5,774,357 A | 6/1998 | Hoffberg et al. | |
| 5,960,411 A | 9/1999 | Hartmann et al. | |
| 6,018,344 A | 1/2000 | Harada et al. | |
| 6,021,403 A | 2/2000 | Horvitz et al. | |
| 6,029,175 A * | 2/2000 | Chow et al. ............... | 707/104.1 |
| 6,035,332 A | 3/2000 | Ingrassia, Jr. et al. | |
| 6,038,610 A | 3/2000 | Belfiore et al. | |
| 6,418,471 B1 * | 7/2002 | Shelton et al. ............... | 709/227 |
| 6,535,912 B1 * | 3/2003 | Anupam et al. ............. | 709/217 |
| 6,721,726 B1 * | 4/2004 | Swaminathan et al. ......... | 707/3 |
| 6,725,425 B1 * | 4/2004 | Rajan et al. .................. | 715/205 |
| 6,769,009 B1 * | 7/2004 | Reisman ..................... | 709/201 |
| 6,820,111 B1 * | 11/2004 | Rubin et al. ................. | 709/203 |
| 6,879,586 B2 * | 4/2005 | Turovsky et al. ............ | 370/356 |
| 7,062,475 B1 | 6/2006 | Szabo et al. | |
| 7,200,804 B1 * | 4/2007 | Khavari et al. .............. | 715/230 |
| 2001/0020243 A1 * | 9/2001 | Koppolu et al. ............. | 707/513 |
| 2001/0032254 A1 * | 10/2001 | Hawkins ..................... | 709/219 |
| 2001/0038624 A1 * | 11/2001 | Greenberg et al. .......... | 370/352 |

(Continued)

*Primary Examiner*—Joseph P Hirl
(74) *Attorney, Agent, or Firm*—Fitch, Even, Tabin & Flannery

(57) ABSTRACT

A system and method for tracking a user history, for presentation thereof within a browser display. An executable software construct operates at a client machine to trap object references, which are then transmitted to a server. The server analyzes the object references and organizes them into a display structure. The display structure is then displayed within the browser, including hyperlinks to allow the user to select a prior system state to which he seeks to return. Preferably, the software construct also manages objects associated with the object reference, for example cookies associated with URLs, in order to assure full definition of the desired state. The display structure may also be provided to browsers distinct from the originating browser.

22 Claims, 3 Drawing Sheets

U.S. PATENT DOCUMENTS

2002/0001300 A1* 1/2002 Miloslavsky et al. ........ 370/352
2002/0013834 A1* 1/2002 Esakov et al. ............... 709/223
2006/0253594 A1 11/2006 Szabo
2008/0055229 A1 3/2008 Shen et al.

* cited by examiner

Fig. 1A
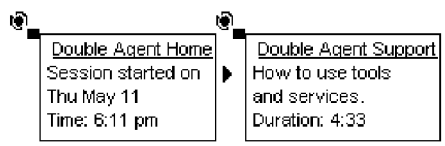
Fig. 1B
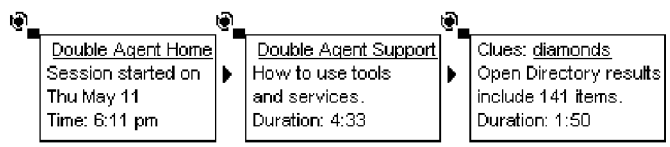
Fig. 1C
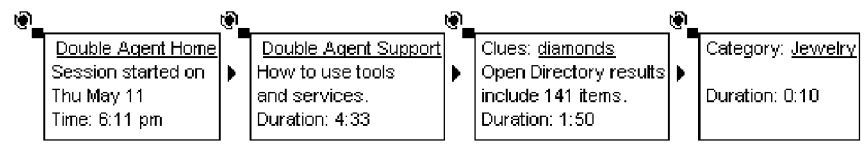
Fig. 1D
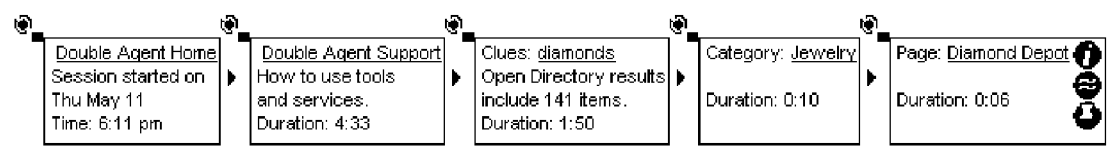
Fig. 1E

PERSONALIZED MULTI-SERVICE COMPUTER ENVIRONMENT

The present application is a continuation of U.S. patent application Ser. No. 11/423,847, filed Jun. 13, 2006, which is a continuation of U.S. patent application Ser. No. 10/715,218 filed Nov. 17, 2003, now U.S. Pat. No. 7,062,475, which is a continuation of U.S. patent application Ser. No. 09/584,057 filed May 30, 2000, which is abandoned, each of which are expressly incorporated herein by reference.

FIELD OF THE INVENTION

The present invention relates to the field of personal and personalized information services, and more particularly to the field of improved personalized computer user interfaces for database systems, more particularly those systems designed to organize information and information object references.

BACKGROUND OF THE INVENTION

Vendors of information appliances, such as personal computers, and even embedded devices with human computer interfaces, have often wrestled with providing an optimal presentation of customized of personalized information, both in the nature of the information to be presented, and the optimal presentation thereof. Personalization and customization of computer user interfaces is often in conflict with a desire for standardization and consistency. Thus, the more an interface is malleable to represent personalized factors, the less that interface represents a standard, and that deviation can lead to support and training difficulties. See, e.g., Horvitz et al, U.S. Pat. No. 6,021,403, expressly incorporated herein by reference.

In order to customize computer user interfaces, typically the visual factors are treated as objects, such as view type, font, color scheme, wallpaper, sounds, icons, and the like, which may be altered globally or locally by altering a characteristic of the visual object. In order to personalize computer user interfaces, typically the layout of different types of information, such as news, weather, financial data and the like, is predicated by interests of the user.

As a separate scheme, computer user interfaces may also track a user's activity, thereby creating a history. It is often desirable to facilitate common functions of programmable interfaces for the user and/or to recall recently performed operations that are desirable to be repeated or for which traceability is desired. Thus, many software constructs record a list of recently used files, which is then presented as a readily accessible list of potential choices for the user. Likewise, graphic user interfaces for operating systems and favorite lists for browsers are generally directly modifiable by the user to alter the selection and grouping of information-related objects presented.

In a system having a hypermedia structure, information objects can be browsed by following links provided between each other. In conventional hypermedia systems, however, a problem may often occur in which a path that the user has followed is lost and the user cannot return to a desired location or the user becomes unable to make out his whereabouts in the system. This problem is generally known as the problem of lost path in the hypermedia system.

Conventional hypermedia systems often have history files that tell the routes the user has followed. Generally, most of such history files simply list character information in the order in which the user has been browsing. Some of the history files indicate the hypermedia links in a tree structure to allow grasping of the connection state of the information objects, while others show the nodes in images reduced in size and sometimes referred to as thumbnails.

Modern Internet browsers, such as Microsoft's Internet Explorer, and Netscape's Navigator provide access to a list of viewed Web pages, albeit through different means. This history is generated automatically based on actual Web pages viewed, and is non-editable by definition, except that Microsoft allows deletion of pages from the history list. Revisits to a Web page add additional versions of the page in the history list of Microsoft Internet Explorer. The browser history is acquired as a list of the Web page addresses referred to as URLs, or uniform resource locators, represented in the address input box of the browser. If a desired object is not identified by a representation in the address input box, it is not recorded or not definitively recorded, and indeed also cannot be appropriately added as a favorite. This history may thus incompletely define the state of the system, for example, when the system executes a script, applet or plugin, or other machine state not fully defined by the URL. In these cases, the history list is not usable to completely restore a prior state of the browser.

A Uniform Resource Identifier (RFC 1630) is the name for the standard generic object in the World Wide Web. Internet space is inhabited by many points of content. A URI (Uniform Resource Identifier is the way you identify any of those points of content, whether it be a page of text, a video or sound clip, a still or animated image, or a program. The most common form of URI is the Web page address, which is a particular form or subset of URI called a Uniform Resource Locator (URL). A URI typically describes: the mechanism used to access the resource; the specific computer that the resource is housed in; and the specific name of the resource (a file name) on the computer. Another kind of URI is the Uniform Resource Name (URN). A URN is a form of URI that has "institutional persistence," which means that its exact location may change from time to time, but some agency will be able to find it.

In these known systems, only Web pages and downloaded elements are stored and recorded. In contrast, certain information, such as search queries that are not returned as part of a URL, as well as other arbitrary information selected by the user or server, cannot be included on the history list unless separately represented as a defined Web page. Thus, scriptlet and applet communications sessions may completely bypass the browser's ability to record the session progress, and thus make the browser unable to define the associated states and return to a prior state.

A related problem occurs where the remote server employs cookies to define the Web page transmitted. If the cookie is changed, and indeed such changes may be made by the remote server during subsequent interaction, the state defined by the URL cannot be used to return the browser to the prior state.

Cookies files stored in conjunction with user agents (web browsers, etc.) to hold small amounts of state information associated with a user's web browsing. Common applications for cookies include storing user preferences, automating low security user signon facilities, and helping collect data used for "shopping cart" style applications. See, RFC 2109, Network Working Group, HTTP State Management Mechanism. See, also RFC 2068, Network Working Group, Hypertext Transfer Protocol—HTTP/1.1

U.S. Pat. No. 6,018,344, expressly incorporated herein by reference, provides a system which, at a server, records requests for URLs by users, and provides a two dimensional map representing the usage history. U.S. Pat. No. 6,038,610, expressly incorporated herein by reference, provides a system and method for storage of site maps at respective servers, which are then communicated to client systems.

Because of the limitations just discussed, among others, the implemented history list function employed by available browsers, i.e., standardized software executing on client systems for interacting with the Internet Web servers, fails to achieve the ability to return reliably the browser to a prior state in a number of common instances.

In order to elucidate the problems involved in capturing the user's session history, it is necessary to consider the state of the client and server during a user session. In order to define the state of the machine, user activity is tracked. Storing a complete image of all processes, memory and registers is untenable, since literally this requires turning back the clock, with loss of all intervening information, which is either impossible or itself undesired. User activity may traditionally be tracked in a number of known ways. For example, a local computer application can track user activity. Likewise, any system interposed within a necessary communication path may also log user activity. A computer identifier, such as commonly included within a browser cookie, may be used to identify, and thus subsequently track the user, at a remote server. However, since the user may delete browser cookies, this technique is not reliable between sessions. In some cases, a communications address, such as an IP address, may be used to track a user; however, since users may share IP addresses, and IP addresses may be dynamically assigned, this technique is not globally reliable between communications sessions.

SUMMARY AND OBJECTS OF THE INVENTION

The present invention therefore seeks to provide improved human computer user interfaces, as well as supporting infrastructures. A particular problem confronting a user is an organization of information in a usage session or group of sessions. As a part of typical usage of an Internet system, users explore new content, through search engines, embedded hyperlinks, and the like. Often, the exploration is initially unfocused or noncommittal, as the user seeks to understand the field being searched. This initial exploration may include trial and error content review, as well as a comprehensive or exhaustive search of potentially relevant information. Typically, this exploration precedes normal and specific usage of the information, and thus the process invariably includes some degree of backtracking over previously reviewed information.

The present invention thus provides enhanced methods for the identification, recall and organization of search paths and results.

These are effected by improved methods of tracking, user activity, thus defining relevant states, and improved methods of presenting past user activity patterns, thus facilitating efficient usage thereof.

In some cases, the exploration phase conducted by one user may be used to facilitate the search by another. Thus, the search path may be employed as an object that is employed by other users.

These objects are created to record goal-directed behavior of the user, and may thus be relevant to other users having the same goals. Often, the goal is a more complex semantic concept than any single search represented within the set, and thus the identification of the goal may be a richer source of information regarding a user and the surrounding context than search queries. Once the goal is defined, an automated system may be provided to anticipate the user's requirements, which may then be presented to the user. Advantageously, when the detected or defined goal includes a transaction, an automated system is provided for presenting to the user transaction possibilities within the scope of the goal. Thus, for example, advertisements or other commercial information may be presented to the user. When the user's goal is non-transactional, the system may operate differently. For example, goal-related information from a variety of sources and general type advertisements may be directed to the user.

Internet search engines and portals typically operate on a commercial subsidy model; this may include payment on a per-ad basis, a per-click-through basis, or a per-consummated transaction basis, for example. The use of targeting technology tends to favor transaction-biased models over ad-volume-based models. The present invention thus provides a capability for higher-level analysis of the user, at a goal rather than search query level. This technique may also be combined with user profiling, such that the status, context and history may be used to adaptively define the state of the system. See, U.S. Pat. No. 5,774,357, expressly incorporated herein by reference.

The Internet's World Wide Web is typically considered a large set of Web pages that are aggregated into Web sites, with each Web site generally having a home page, from which other Web pages are accessible through hyperlinks. Normal use of the Web site may therefore entail multiple viewings of the home page. A diagram of normal usage therefore often appears like a hierarchal tree, with the home page at the root, other pages as branches, and potentially detailed pages or referenced database entries as leaves. Of course, embedded hyperlinks and other types of usage may complicate the diagram.

Present browsers support "back" and "forward" functions, which allow a user to move through a historical list of visited Web pages to a referencing Web page (back), and referenced Web page (forward). However, where there is an ambiguity, the forward function provides the last visited page, and the back function provides a "higher level" referencing page. Thus, in a complex Web site, the back and forward functions may fail to provide full navigational capability. In short, history-of-use information is lost.

The present invention addresses this problem by providing a "Session Mapping™" feature, in which one or more time lines are constructed from "history objects" that are, for example, each defined by a set of one or more Web pages visited by the user, and, potentially, activities performed by the user with respect to those Web pages. Thus, a user may return to a past-visited Web page by direct and random access thereof. This history object and related information, for example, may be stored as an information object at a server, and therefore, the user may potentially end his browser session without loss of the history context for that session. Likewise, this history object may be provided in editable format and further presented or transmitted to other users, allowing a sharing of a search experience, as well as a possible viral marketing advantage to the provider of the session mapping service or its sponsors. The history object may preferably also include a chronology, allowing a synchronized presentation of the history object, for example using Synchronized Multimedia Integration Language (SMIL) [Boston Specification (W3C Working Draft 3 Aug. 1999; http://www.w3.org/1999/08/WD-smil-boston-19990803)].

Preferably, a history object is defined as a set of URLs, optionally with descriptive text, time, duration and/or number of accesses. This information is preferably presented with management and organizational tools for editing and organizing a set of history objects. The editing functions may include, for example, stripping of personal information from the URLs, for example where a user seeks to generalize the history object for third party use. Other functions may include deletion of certain steps or URLs, insertion of objects or URLs, appending and truncating sequences, saving and recalling, manual editing of command line entries and associated files, e.g., cookies, and archiving. Organizing functions include naming, renaming, ordering, deleting, copying, sending, receiving, sharing, privatizing, and "sanitizing" of history objects. The system may also provide a sanitizing function, for example, globally analyzing the URLs and associated objects to ensure that they do not contain personal information or private passwords (and if so, eliminating this information) and do not contain obscene or scandalous materials. This later analysis may include implementation of a (Mattel) Cyperpatrol-type filter along with semantic filtering. This filtering may encompass the history object itself, or require an analysis of the pages and objects referenced within the history object.

A particular aspect of the present invention is that it allows a dynamic process to be defined. If a URL in the history object references a Web page whose underlying information changes, e.g., if the URL itself defines a search query on a database, and the contents of the database change, or the URL defines a dynamically defined object, then the subsequent access of the URL through the history object will represent the updated content. Thus, the history object may be used to define a set of content dynamically.

On the other hand, sometimes a user seeks to define information statically as seen at a particular point in time. If the exact state of the URL is intended to be preserved, means may be established to cache the Web page content and reference the cached content rather than live Web page content, e.g., through an alias. This caching may be performed locally or through an external service. Typically, the history object will continue to appear to reference the source page (live) URL, although a hyperlink will direct recall of the cached copy.

In still further instances, a user is interested in analyzing changes in the referenced Web pages. Therefore, both the cached and live versions of a Web page would be pertinent. Such analysis may also be performed locally, through a special application, or by corresponding application on a server.

In some cases, the client computer request to the server does not correspond to a stateless. URL, and therefore the URL transmitted by the browser to the server would be insufficient to fully define the returned information. Rather, the returned information may relate to additional information, such as a sequence of events leading up to when the URL is transmitted to the server, or information defined by a cookie. The present invention, in fact, addresses both of these possibilities. With respect to the former, the history object directly addresses this issue by maintaining the sequence (path) by which a user achieves a given state of the system. With respect to the later, the present invention preferably encompasses a cookie manager, for example operating as an application within the client system, or on a remote server, which associates an appropriate cookie with each step within the history object, where necessary. Thus, the state of the cookie at the time of the original reference is preserved. As discussed above, according to one embodiment of the invention, the cookie manager resides within a server. In this case, the server acts as a third party proxy to the request. The client browser transmits URLs through the proxy server, and these URLs are modified as appropriate to achieve a desired state. In fact, a macro-sequence of URLs may be triggered to, define automatically a complex, path-dependent state with a single act by the user. Rather than acting as a complete proxy, requiring the proxy server to stand as an intermediary for all communications, the proxy server may spoof the client system's address (i.e., send a communication with a false IP address, causing the communicating partner to respond to redirect communications). It is noted that, while generally, spoofing is considered an undesirable security violation, in instances where the respective parties are aware and permissive of this activity, it may be an acceptable method. Alternatives to spoofing to achieve essentially the same results may be employed as well. Thus, in this asymmetric communication case, the proxy server selectively intercepts upstream communications and not the downstream communications. When the server downloads a cookie or applet to the client, this communication bypasses the proxy; however, the next time that modified cookie is uploaded, it passes through the proxy, and is captured at that time.

It is noted that some of the functions implemented by the system according to the present invention are generally deemed to require security permissions or certifications. The user therefore will typically be requested to configure the security settings (or allow automatic reconfiguration by, or example, an applet) to permit system operation. The functionality gained from use of the system will, of course, provide sufficient benefit to the user to interest him in configuring the system (or allowing system reconfiguration) for such operation. Alternately, in most instances, the functions according to the present invention may also be implemented without requiring security setting reconfiguration, or in systems which do not support some of the functionality, such as scripts and applets. For example, displays may be presented as static web pages without scripts or applets, with necessary communication directly with the server or through a formal proxy server/application server.

It is noted that this type of proxy may be present as a separate resource on the Internet or within a local area network. Furthermore, this proxy may be integrated with another proxy server, such as a firewall device.

It is further noted that the cookie substitution and other aspects of the transaction need not be transparent to the proxy server; the information may be fully encrypted, since the proxy server acts in a content-neutral fashion. So long as the address information within each packet is open, and cookies are unambiguously identified, the proxy may perform its intended function.

In order to allow this type of three-party communication, the content server system is preferably "fooled" into thinking that the communications are actually separate two-party streams. For example, the history object may form the basis of a communication to transmit a URL and possibly associated information, such as cookies, thus defining the desired state, to the proxy server. The proxy server then forwards the URL and optional cookie, each of which is possibly modified to achieve the desired state of the client system, to the content server.

Correspondingly, the proxy server returns a simple redirect response to the client system, including an appropriate URL for the content server. The content server, in this case, responds to the spoofed (forged IP header) communication, effectively pushing the Web page to the client. The client system, in turn, since it has requested a URL from the content server via the redirect, sees the returned Web page as being the one requested, and accepts it. The proxy server function is therefore implemented without modification of the remote server, and with minimal modification of the client system (e.g., ensure security is set with permission to accept server-side redirect), and therefore maintains broad compatibility.

The history object characteristics may be contained within an application or applet, including the desired functionality, and executed on the client system hardware. In this case, greater flexibility is available, but may result in certain incompatibilities. For example, the IP stack itself may be modified to implement the desired functions, which in this case would include a parallel transmission of packets to the remote server and history management server. Thus, a remote history management server would be assured a complete record of the transmitted information. Likewise, a local server may be provided proximate to the client system, through which the browser communicates. In this case, all transmitted and received URLs and Web pages may be managed locally. It is noted that an OCX (Microsoft ActiveX applet) may be able to perform these types of functions.

A Session Mapping™ applet or scriptlet may also be provided on the client system to capture the URL information, which may then be stored or transmitted to a remote server. In this case, the Session Mapping™ applet or scriptlet typically does not have access to local operating system level functions, and cannot intercept or alter communications between the browser and stack, or stack and network interface. However, most common browsers do provide a function wherein the most recent URL is available for inspection. Thus, a Session Mapping™ applet or scriptlet may capture this information and convey it to a history management system. Likewise, cookies may be transmitted from the browser to remote servers when properly requested; thus, the appropriate cookies may also be communicated to the history management system.

The Session Mapping™ applet according to the present invention is distinguished from the applet described in U.S. Pat. No. 6,035,332, expressly incorporated herein by reference, since the applet of U.S. Pat. No. 6,035,332 requires that the tracked Web page be served from a controlled or cooperating Web server, rather than any random Web server. It is also noted that the graphic user interface of U.S. Pat. No. 6,035,332 is dissimilar in key respects.

A particular advantage of browser scripts is that no distinct download and installation is necessary. It is noted that some of the techniques described herein violate traditional security principles, and, but for the desirable functionality, might be considered intrusive. It is further noted that the techniques described herein may be used to implement functions other than history management. For example, a similar technique may be used to synchronize two or more client systems on the Internet; for each transaction, one system acts as a master, requesting a URL and also transmitting the URL and an optional cookie to a proxy site. At the proxy site, the URL is also requested, with the identical cookie available for upload. Thus, the states of the two (or more) systems will be synchronized. This technique would facilitate the sharing of a session experience on the Web with many other users.

The techniques according to the present invention may also be used for remote logging and monitoring of users.

According to the present invention, a Session Mapping™ applet may process a history object to recreate the original sequence (or a modification thereof), including an automatic sequencing of states.

In performing a search, typically a large proportion of the pages visited will be irrelevant or secondary. For example, a user searching for jewelry may submit the search query "diamond" into a search engine. The search query URL is trapped by the Session Mapping™ applet or scriptlet and either processed locally or transmitted to the host site. The user is then typically presented with a list of Web pages (URLs) that correspond to the search query. Some of these URLs may contain content only, without opportunity for purchase, while others may include purchasing opportunities. Some responsive URLs may, in fact, be irrelevant or distasteful. Often, the user must explore the presented information in order to categorize the sites. In some instances, the user may search the topic using a variety of search terms or execute the same search query on a variety of search engines.

After the user has completed a search and acquired background information, the next step is typically to employ that information gainfully. According to the prior art, the user was forced, using memory or rudimentary tools, to relocate the best sites from the search, which typically occurred before a complete analysis of the available information. This prospect often lead to a truncation of a search when a minimally-acceptable Web page or well-known site was identified, rather than facing the prospect of finding it again using inadequate tools. According to the present invention, the user is permitted to complete his search and investigation, with reasonable prospects of easily finding and retrieving any previously visited sites, including defined states thereof.

As each Web page is visited, it is added to a list, and preferably maintained and presented in a "Personal Services Infrastructure"™ (PSI™) format, which is displayed on the screen generated by a browser and/or applet. For example, this information is presented in a marginal frame of a browser, or within a visually presented applet. Therefore, when the user seeks to retrace his steps, each significant hop or state is separately listed, possibly including additional descriptive information, such as the duration of content viewing, the time(s) of viewing, and the like (the duration of a visit being, among other things, a key indicator of value for the user). Furthermore, each entry may be provided with certain editing features, for example, the URL, description and order may be edited.

In defining a state of the client's session, a number of options are available. Commonly, each Web site is accessed through a special Web page called a home page. Often the Web site home page is associated with an Internet Top Level Domain name (TLD), or domain name, such as WWW-.MYSITE.COM. Therefore, the membership of web sites is often classified based on the associated domain name. Other methods are available, however, to determine membership within a Web site. According to one embodiment of the invention, each Web site is provided with a separate region within a Session Map™. When the user selects a respective region of the Session Map™, the chronological path of the user within that Web site may be expanded, possibly with a hierarchal representation of the organization of the site (or limited to pages hyperlinked by the user), or to a linear session map opening from within the segment of the session map. Of course, the user may traverse a path that seamlessly traverses a number of TLDs or Web sites, so that this distinction may be arbitrary. Thus, other modes of presentation may be offered to the user, based on the stored information and possibly an analysis of the Web page content referred to thereby. Another organizational method relates to the amount of time that a user dwelled on a web page, or composite set of pages, e.g., a site; the longer the dwell, the higher the implied importance. A further organizational principle involves analyzing the use of a Web page as a hub; if the user returns to a page a number of times in the course of an activity, that page is considered an important hub, with Web pages traversed thereby considered spokes. This analysis, it is noted, does not require that the TLD be the same for the hub and spokes.

Another organizational principle seeks to employ Web page expiry data. Typically, a static home page will not expire, while dynamically generated pages quickly expire. Pages that have associated ID numbers (or alphanumeric sequences) typically result from a sequence of actions, wherein the user session, is initiated and tracked by means of the ID number. In order to recreate the state of the system, the series of URLs and forms which lead to the desired URL must be replicated, allowing the ID number to change according to the newly recreated sequence. Thus, the history object is processed by an application to parse URLs and construct synthetic URLs representing the desired states, without forcing the user to track manually the prior actions. In this case, when a user selects a Web page that requires a series of interactions to recall from the server, this series of interactions is automatically invoked from a logical starting point. In representing this to the user, it is the lower level Web pages within a hierarchy that take on greater importance, with the higher level Web pages serving merely as conduits. Thus, if the history display is collapsed, it is the end Web page that is represented, and the path toward that Web page becomes unveiled only when the user specifically selects the end Web page.

In this regard, the history of use may be represented as a set of chains, with the top and/or bottom of each chain defining a relevant feature or identifier, and the intervening portions having presumed lower importance. Each node within the chain may be represented by a separate history object. Thus, a two dimensional data set may advantageously be normally represented as a one dimensional "time line," preferably with only one hierarchal chain visible at a time, and otherwise merely with an identification of the chain available for access by the user.

An example where the highest level is relevant to the user is, for example, at a corporate Web site, where a user is investigating various aspects of the company. The home page is therefore an appropriate starting point and identifier for the string of events.

On the other hand, an example where the highest level is not relevant is where the user is searching a set of content through a portal. In this case, the identification of the portal is nearly irrelevant. The search query, however, defines the data set, with the retrieved and inspected URLs or Web pages encompassing the relevant material. Thus, the string is preferably defined by the search query.

The present invention provides a procedure that records in detail a history of a search, notwithstanding that a respective search engine does not or cannot do so itself. The present invention therefore seeks to trap or capture detailed information about the path taken by the user in completing a task, including scriptlet and applet usage, regardless of which search engine or server is accessed for information, and preferably allows a standard browser to be employed.

According to a preferred embodiment of the invention, the history is provided for each session, and extends for the duration of the session. The history is preferably presented as a time line extending horizontally, which may be scrolled horizontally or which is wrapped in successive rows, as the listed history exceeds the column width. Preferably, the time line also captures the beginning and end time of each state, or the duration, or both. The time-line entry for each page or step may be annotated or provided with descriptive text, which may be provided by a history object, automatically generated from the history object, or manually associated with the history object. Preferably, the time line information includes details sufficient for the user to understand the nature of the transition between successive history objects. Preferably, also, the time-line is searchable by text or by characteristic, such as URL, title, date, time.

According to the present invention, this presented history need not encompass a literal record of the path taken by the user, but may, in fact, include information derived from a variety of sources. First, the information list may be enhanced to include advertisements or marketing information. This information is preferably derived either from a user profile, and predicted to be relevant to the user based thereon, or from the search context, and thus related to the information included within the history. Therefore, it is apparent that a presented history bar, including history objects and supplemental commercial objects, may be a source of commercial subsidy. By linking the commercial subsidy with a useful feature, consumer acceptance thereof may be enhanced.

The information may also be enhanced by analysis and presentation of additional content, distinct from the actual history. In some cases, this enhanced information may be identical to the advertisements; thus, where a user is seeking to make a purchase, and the search is for relevant vendors, the enhanced information is an advertisement of the type sought by the user. In other instances, the advertisements are of a general nature. Additionally or alternatively to advertising information, other enhanced information may be provided. For example, hints or suggestions, motivational messages, or other information may be automatically or manually inserted.

In some instances, the system is not supported by commercial subsidy. Therefore, the enhanced information presented may take the form, for example, of goal directed enhanced information or status information.

The graphic display objects according to the present invention may also include user interface functions for performing complex tasks or URL references. Thus, in contrast to prior systems presenting a user history as a set of URLs accessed by the user, the present invention provides enhancements to the accessible functionality with respect to identifications of past activities.

Typical functionality which may be made available, as appropriate, include "summarize page," "find like sites," "add to favorites," and "add to shopping cart," "vote on value of site (or product)," "see others' votes," "make a note," "see other users' notes," or an omnibus service icon or control that brings up a group of choices.

It is therefore an object of the invention to provide an apparatus, comprising means for automatically tracking a URL path of a user; and means for displaying the URL path of the user.

It is a further object of the invention to provide a human computer interface enhancement for an object browser, each object having an object resource locator, comprising means for automatically logging an object resource locator traversal history by the user; and a software construct, executable for defining a display pane in conjunction with the browser, said display pane comprising a set of hyperlinks and associated human-readable tags for object resource locators.

It is a still further object of the invention to provide a history display system, comprising means for automatically storing a history of object references by a user; means for editing, by the user, the stored history; and means for display of the history, wherein said display hyperlinks to the referenced objects to allow arbitrary selection of an object.

It is another object of the invention to provide a history display system, comprising means for automatically storing a history of states induced by a user; means for editing, by the user, the stored history; and means for display of the history, wherein said display hyperlinks to the referenced states to allow arbitrary selection of a historical state. The display hyperlinks are preferably displayed linearly, in chronological order. The display hyperlinks may also be displayed in hierarchal order, and may include importance-weighting information.

It is a further object of the invention to provide a method of trapping URL references in an unmodified Web browser, comprising the steps of providing an applet executing in association with the Web browser, storing a current URL as a favorite within the browser, and capturing a last saved favorite URL from a favorites list.

It is a still further object of the invention to provide a method of trapping URL references in an unmodified Web browser supporting frames, comprising the steps of loading a Web page from a cooperative server in a first frame; identifying a desired URL with the browser to request an Internet resource in a second frame, providing a script in the first frame to capture the identified URL in the second frame and transmit it to the cooperative server, and downloading, from the cooperative server to the Web browser first frame, a sequence of identified URLs.

BRIEF DESCRIPTION OF THE DRAWINGS

The purpose and advantages of the invention will be apparent to those skilled in the art from the following detailed description in conjunction with the appended drawings, in which:

FIGS. 1A 1E show sequential states of a history display applet; and

DETAILED DESCRIPTION OF THE PREFERRED EMBODIMENTS

EXAMPLE 1

Figure 3:
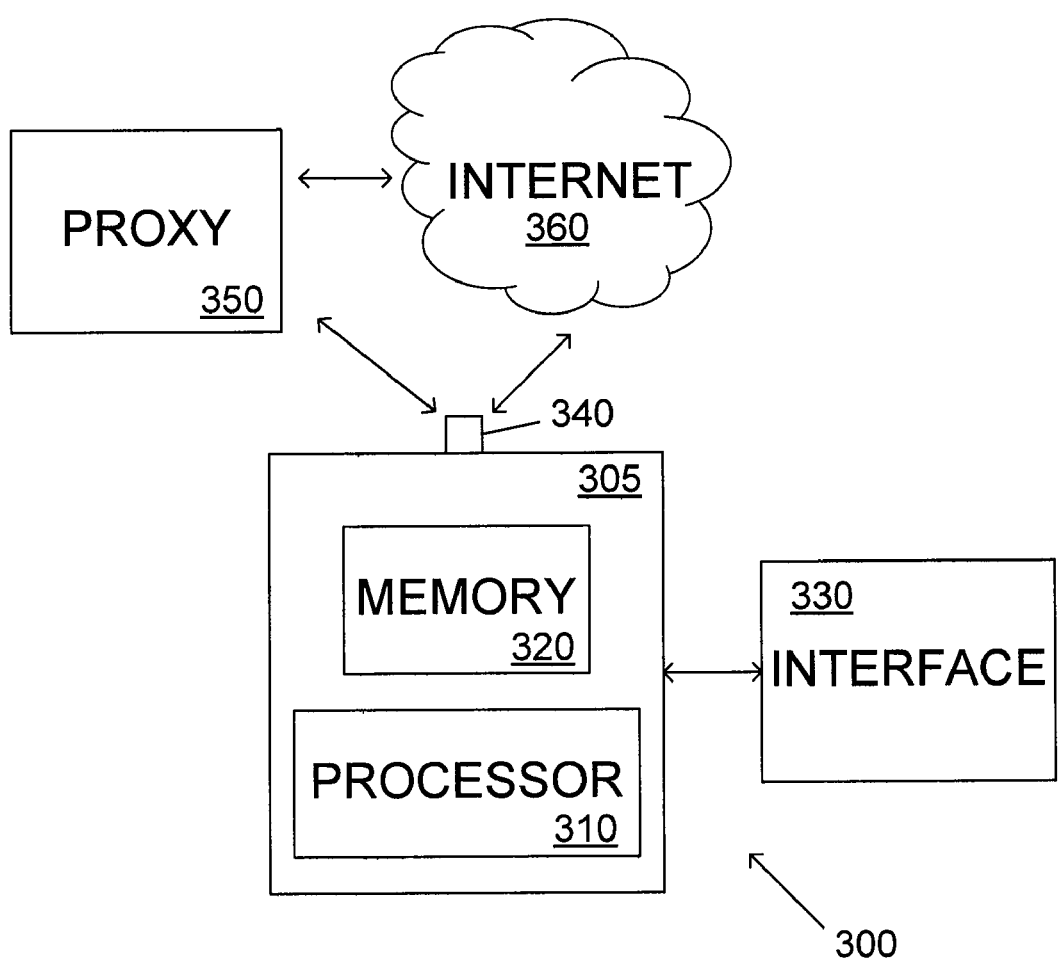
FIG. 3 shows a block diagram of an apparatus in accordance with various embodiments as described herein.

With reference to FIG. 3, a first embodiment of the invention provides a system 300 which operates in conjunction with a modern Web-enabled computer system 305 having a processor 310 and a memory 320 with a standard browser installed and accessible through an interface 330. For example, a so-called WinTel (Intel Pentium III Processor, executing Microsoft Windows 9X or NT/2000 Software) standard personal computer and either Netscape Navigator or Microsoft Internet Explorer, both of which are JavaScript and Java enabled, and frames-capable. Alternately, an Internet appliance platform (e.g., designed specifically for Internet usage rather than general purpose home or office tasks) may be employed. The system communicates via a communications port 340 with remote server such as proxy 350 (or cooperative remote server) which is provided as discussed herein and the Internet 360.

A particular aspect of this embodiment of the invention is that enhanced features are provided for a standard browser system by means that do not require use of non-standard browsers, a special installation procedure or a computer reboot. Thus, the system provides broad compatibility, platform independence, portability, and a low probability of causing conflicts, system bugs or instabilities. The server-side hardware technology is also standard, while the server application software is custom.

By operating within frames, the browser permits two Web pages to be displayed simultaneously and to be interactive. This communication or interactivity occurs within the browser and generally is subject to certain security controls. Accordingly, certain security measures that seek to limit inter process communications and preemption must be disabled.

FIGS. 1A 1E show a sequence of Session Maps™, generated by an applet executing within the user's web browser. In the Session Maps™, a user's progressive search on the Web for a diamond ring merchant is traced. Each frame represents a step, and any previous step can be returned in one click by treating that frame as a hyper-link. In the first step, shown in FIG. 1A, the user is represented at the home page, "Double Agent". In the second frame, shown in FIG. 1B, the user accesses the "Double Agent" support page. In the third frame, shown in FIG. 1C, the search query itself, "diamonds," is captured. In the fourth frame, shown in FIG. 1D, the user selects a taxonomic class, "jewelry" (which is distinct from, for example, baseball, industrial, and graphic images involving the same word). The fifth frame, shown in FIG. 1E, captures user's finding of a relevant Web page, "Diamond Depot." The icons in the fifth frame represent a set of single-click services available to the user, with respect to the represented Web page. These services include "find like sites," "save to favorites," and "add to shopping cart," which are represented as icons within a respective frame, where appropriate, and "summarize page," represented by an icon external to each frame within the chain. For example, the shopping cart is available only for Web pages compliant with a shopping cart standard associated with the system, while the find like sites, save to favorites and summarize page are available for Web pages in general. Other possible services available to be offered through icons associated with the segments of the session map include: make an annotation; see other user's annotations or comments; vote on the worth of a site; see others' votes; see review information; compare price; see address, phone, e-mail and/or other contact information about a web site.

In practice, the user calls up a URL 1 in the browser 10 from a cooperative remote server which provides a pair of frames; a first frame 3a controlled by the cooperative remote server, having an associated executable software construct, e.g., JavaScript, and a second frame 3b for display and manipulation of content. The user, within the second frame 3b or in the address bar, identifies a desired URL 1, for example by typing or hyperlinking. The JavaScript construct captures the URL 1, which is then transmitted to the cooperative remote server.

The cooperative remote server then uses the acquired URL 1, which is transmitted in a form that identifies the browser system or user thereof, to construct a history of use for the session, called herein a Session Map™. The history of use is then transmitted back to the first frame 3a, and displayed for the user, including a set of hyperlinks, each defining a respective prior state of the system and allowing return thereto.

The history of use is preferably displayed with a second JavaScript construct, in the form of a time line 4, for example disposed horizontally at the bottom of the screen. The remote server analyzes historical sequences in order to define goal-directed behavior sets and to segregate distinct goals. This segregation is based on conceptual factors, such as the relation of sequential URLs, e.g., hierarchal relation within a Web site or file storage system, time spent at particular Web pages or web sites, hiatus between uses or activity, semantic analysis or search queries or Web pages, as well as layout issues, such as an optimum number of displayed behavior sets, e.g., five displayed horizontally across the screen, complexity of each behavior set, and the like.

The conceptual analysis may also seek to separate mixed concepts. For example, a user might be conducting two or more searches simultaneously, which may be related or unrelated. If these are related, the desired Session Map™ consolidates the histories and resolves ambiguities or artifacts. If these are unrelated, the desired Session Map™ isolates the trails, either as separate goal directed behaviors in the displayed linear sequence, or as a separate time line sequence.

Each goal directed behavior identified in the time line display represents one or more states of the browser. If the number of goal directed behaviors exceeds the display space, then the display applet may provide scroll functions. Alternately, the display may be provided within a frame, with scrolling supported by the browser and/or operating system.

The remote server seeks to provide, for each set of states, a semantic description thereof. In some cases, a graphic or acoustic description or label is preferred. Therefore, the present embodiment may support flexible labeling, including text, icon, thumbnail graphic, sound clip, or the like. The remote server may derive these labels by first, an analysis of the URLs, to determine whether the URL conveys a useful semantic label. For example, in many cases, a search engine query is a part of the URL and is descriptive the content of the Web page, as well as the associated set of Web pages. In other instances, the URL will be uninformative. In that case, the remote server may request the page, and perform an analysis thereof, to generate a summary or topical statement (or, if appropriate, musical clip, icon or thumbnail). The result of the analysis is transmitted to the browser, for display associated with a hyperlink. When the user selects the hyperlink, the entire associated chronological string is revealed. This string may be stored internally within the browser, or downloaded from the server. According to one embodiment, the search history is presented as a hierarchal tree, with each node of the tree representing a URL, and being hyperlinked thereto.

EXAMPLE 2

Figure 2:
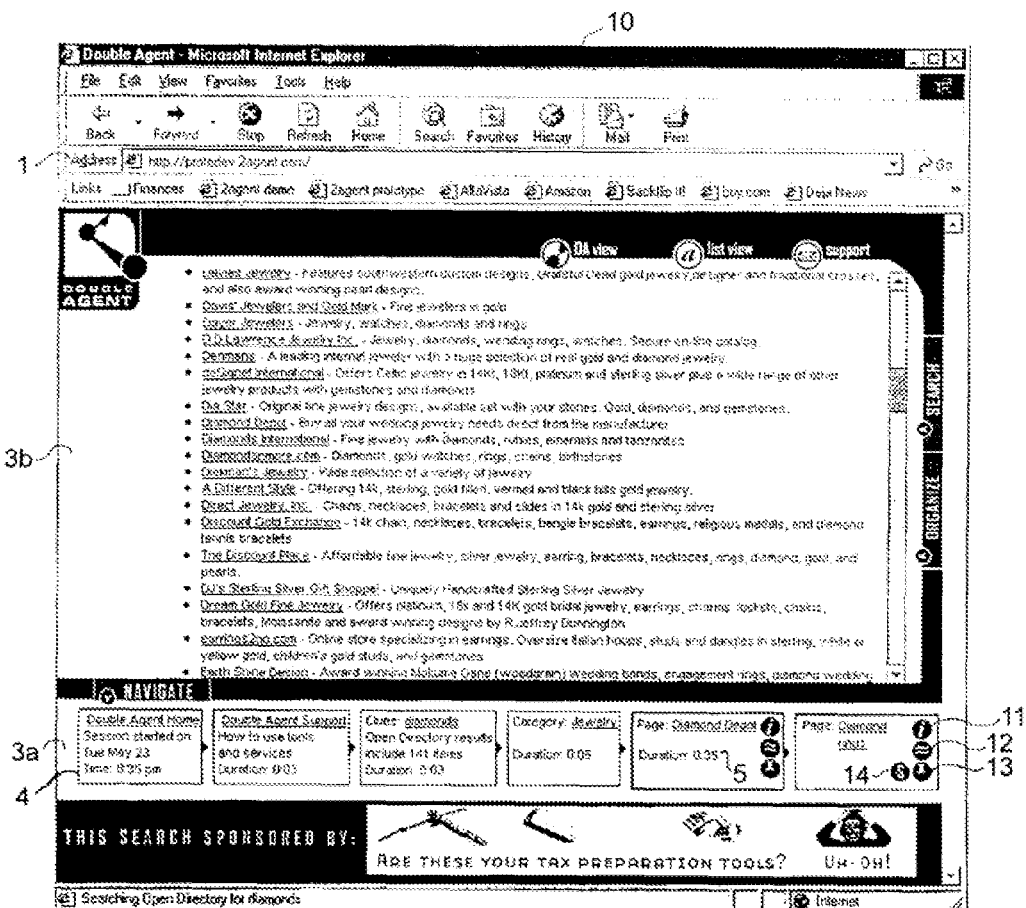
FIG. 2 shows a Web browser user interface.

The present invention provides a set of Mini Agent™ functions that may be associated with objects, for example representing web pages or web sites. These are described with respect to FIG. 2.

A first Mini Agent™ function, providing a summarize page function, is accessed by selecting a hyperlink icon 11 associated with a history object representing a Web page. The icon 11, for example, shows a script lower case serif "i", representing "information". The hyperlink, in turn, includes an identification, e.g., URL, of the Web page, which is passed to a summarizer server. The summarizer server receives the URL, and accesses a database, to determine whether an existing summary exists for the URL. If so, this is returned to the user. If not, the summarizer accesses the URL, and performs a semantic (or other content-dependent) analysis of the corresponding Web page, and optionally objects incorporated into the Web page. As a result of the semantic or other content-dependent analysis, a brief message is passed to the user, providing a Web page summary. A preferable semantic analysis analyzes the Web page text to parse context-defining words or phrases, of which many web pages have few, and transmits these parsed words and phrases to the user. An editor may also analyze Web pages and, for example, store manually generated summaries in the database.

A second Mini Agent™ serves to "find like sites". This is represented by an icon 12 corresponding to the mathematical equivalence symbol. Like the summarize page function, the function is accessed by selecting a hyperlink icon associated with a history object representing a Web page. The hyperlink, in turn, includes an identification, e.g., URL, of the Web page, which is passed to a similar site server. The similar site server receives the URL, and accesses a database, to determine whether an existing record, defining a set of similar sites, exists for the URL. If so, this is returned to the user. If not, the similar site server accesses the URL, and performs a content-dependent analysis of the corresponding Web page, and optionally objects incorporated into the Web page. As a result of the content-dependent analysis, a query, for example a Boolean query or other query type, is passed to an Internet search engine.

Alternately, the classification of the Web page within a taxonomic hierarchy may be determined, the similar pages being defined as those that are similarly classified. The resulting list of similar sites is passed to the user. A human editor may also analyze commonly visited Web pages and, for example, store manually generated sets of similar sites in the database. Likewise, a collaborative filter may be employed to provide "similar" pages based on a probability of being accessed temporally proximate in time to the respective Web page by a group of persons.

A third Mini Agent™ is "add to favorites". This is represented by a thumb-tack icon 13. In this case, the function does not represent a URL, but rather a script applet which executes within the browser to add the respective URL of the associated web page to the favorites list maintained by the browser. This script is typically defined distinctly for each history object.

A fourth Mini Agent™ is "add to shopping cart". This is represented by an "S" icon 14. An electronic shopping cart is an electronic store, associated with an individual user, identifying objects for purchase. In this case, the implementation is in some sense similar to that described in U.S. Pat. No. 5,960,411 (Hartman, et al., Sep. 28, 1999), expressly incorporated herein by reference, although the functionality differs. This function may be implemented in two ways. First, the hyperlink may invoke an applet, and indeed may have a context sensitive functionality, i.e., the icon representing the function will vary depending on the Web page or content thereof, or the status of the Web page and/or user system. Second, the existing shopping cart hyperlink from the referenced Web page may be copied or emulated as the hyperlink associated with the icon, and therefore a selection of the icon representing "add to shopping cart" will have the same effect as a selection of that hyperlink from within the Web page itself.

The "add to shopping cart" functionality may be limited to compliant Web sites, providing special support for this functionality, or be available to all sites that have an accessible shopping cart function.

For example, a Web page identified by a URL represents a description of a single item available for purchase. The user, in the midst of a search for the item, may not be ready to consummate a sale, and thus may not wish to place the object in a "shopping cart". Rather, only after a search is complete will a user identify the item and most preferable vendor.

Using the "add to shopping cart" icon, the user may, without reopening the web page, directly add the item to a shopping cart, which indeed the shopping cart may be consolidated for a number of vendors and/or different that the shopping cart normally provided for user of the Web site. At a later point in time, the user may then "check out", or provide transactional details to close the purchase for objects in the shopping cart.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein. The term "comprising", as used herein, shall be interpreted as including, but not limited to inclusion of other elements not inconsistent with the structures and/or functions of the other elements recited.

What is claimed is:

1. A method, comprising:
   forming a composite object representing a path dependent object as an ordered sequence of communications between an object browser and a web server, to achieve a sequence of states;
   presenting the object through the object browser displayed in combination with goal directed enhanced information derived from the ordered sequence of communications; and
   executing at least the ordered sequence of communications to retrieve the path dependent object.

2. The method according to claim 1, wherein the composite object is formed by automatically logging a series of hyperlink-interaction related communications which define the path dependent object.

3. The method according to claim 1, wherein the path dependent object is inaccessible through communication of a single universal resource locator.

4. The method according to claim 1, further comprising presenting a plurality of composite objects through the object browser.

5. The method according to claim 1, wherein the executing triggers execution of a script.

6. The method according to claim 1, wherein the composite object comprises a state-independent script for obtaining the path dependent object regardless of starting state.

7. The method according to claim 1, further comprising the step of logging a user activity to define the ordered sequence of communications.

8. The method according to claim 7, wherein said logging is performed by an applet supported by the object browser.

9. The method according to claim I, further comprising representing a plurality of composite object as user interface elements in the object browser, said plurality of user interface elements being arrayed according to a chronology.

10. The method according to claim 9, wherein the user interface elements each comprise a representation of a duration of browsing.

11. The method according to claim 1, further comprising the step of providing a user interface for editing the composite object.

12. The method according to claim 1, further comprising the step of persistently storing a composite object, for deferred execution.

13. The method according to claim 1, further comprising the step of communicating at least one composite object from a first object browser for execution in conjunction with a second object browser.

14. The method according to claim 1, wherein the composite object is represented as a user interface element in the object browser comprising a hyperlink to a server for controlling the sequence of communications.

15. The method according to claim 1, further comprising the step of determining an importance of the path dependent object, and presenting the composite object through the browser in dependence on the determined importance.

16. The method according to claim 1, further comprising the steps of
   associating supplemental commercial information with the composite object, and
   accounting for a commercial subsidy based on one or more of
      a display of the commercial information;
      a selection of the commercial information; and
      a transaction conducted relating to the commercial information.

17. The method according to claim 1, wherein the composite object comprises commercial advertising information distinct from a browsing path.

18. The method according to claim 1, wherein the sequence of communications traverses states comprising commercial advertising information distinct from a browsing path.

19. A computer-readable storage medium, containing therein a program executable on a general purpose computer for performing the method of claim 1.

20. A method, comprising:
   forming a composite object representing a path dependent object as an ordered sequence of communications between an object browser and a web server, to achieve a sequence of states;
   presenting the object through the object browser;
   executing at least the ordered sequence of communications to retrieve the path dependent object;
   loading a Web page from a cooperative server in a first object browser frame;
   identifying a desired URL with the object browser to request an Internet resource in a second object browser frame,
   providing a script in the first object browser frame to capture the identified URL in the second object browser frame and transmit it to the cooperative server, and
   downloading, from the cooperative server to the first object browser frame, a sequence of identified URLs.

21. The method according to claim 20, wherein the cooperative server provides commercial information to the object browser distinct from the sequence of identified URLs.

22. An apparatus for transforming path dependent object to path independent objects, comprising:
   a memory, storing identifiers of a sequence of states, the sequence of states being achieved by an ordered sequence of communications between an object browser and a web server to define a path dependent object;
   a processor for automatically forming a composite object representing the path dependent object defined by at least the sequence of states;
   an output, for communicating the composite object displayed in combination with goal directed enhanced information derived from the ordered sequence of communications.

* * * * *

UNITED STATES PATENT AND TRADEMARK OFFICE
CERTIFICATE OF CORRECTION

PATENT NO.       : 7,596,533 B2                                      Page 1 of 1
APPLICATION NO. : 11/467888
DATED            : September 29, 2009
INVENTOR(S)      : Szabo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 483 days.

Signed and Sealed this

Twenty-eighth Day of September, 2010

David J. Kappos
*Director of the United States Patent and Trademark Office*